W. L. ULLSPERGER.
MANURE LOADER.
APPLICATION FILED JAN. 8, 1917.
1,242,083.
Patented Oct. 2, 1917.
3 SHEETS—SHEET 1.
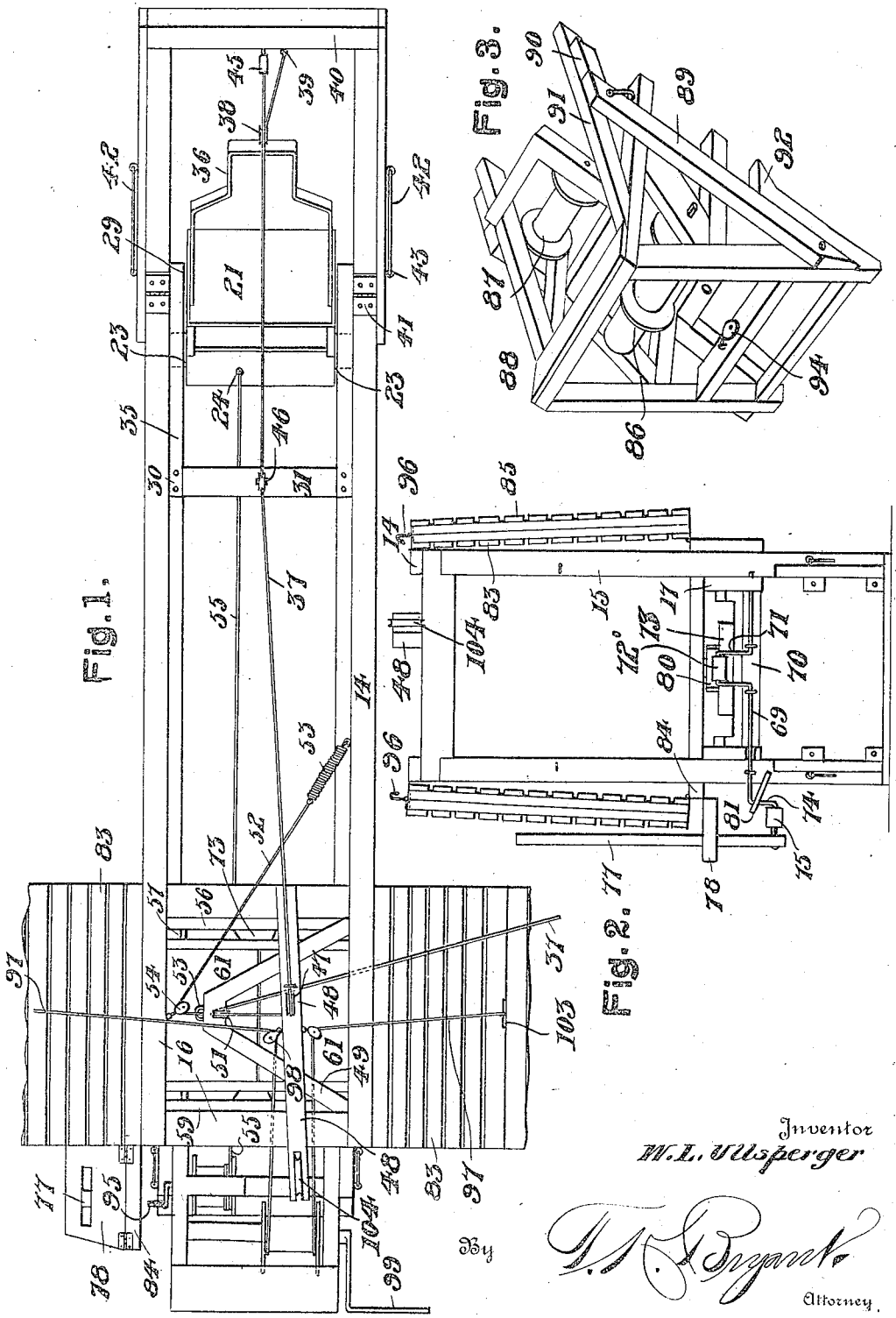
Inventor
W. L. Ullsperger
By
T. J. Bryant
Attorney

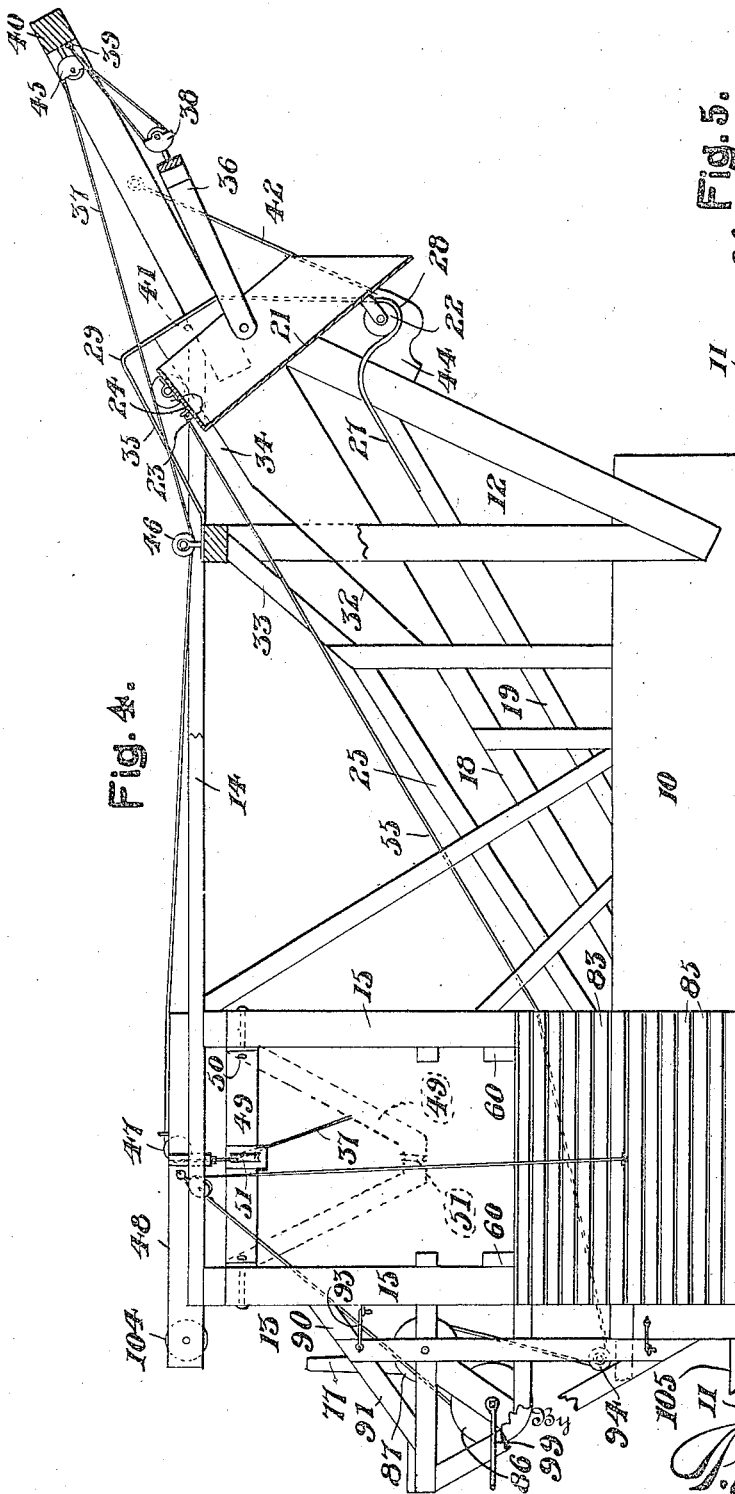
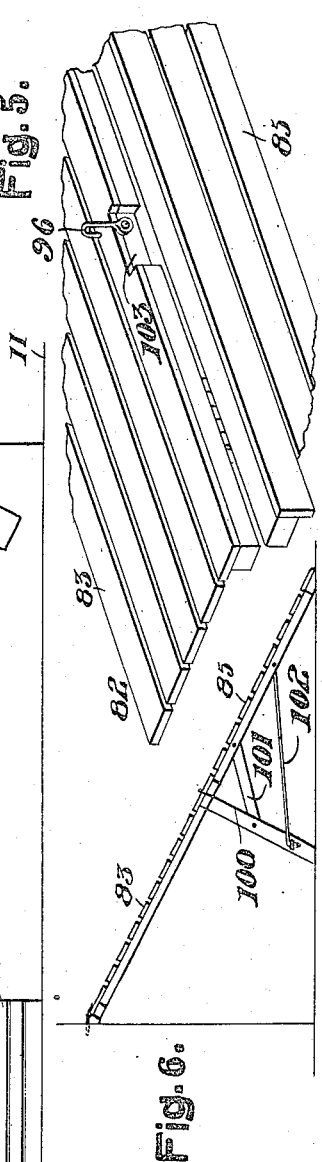

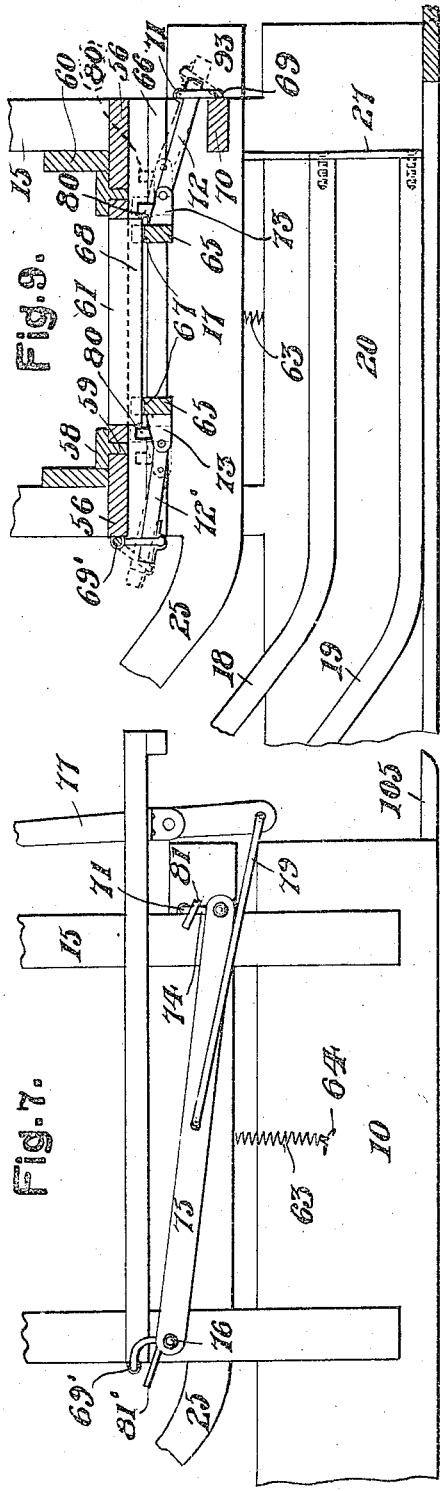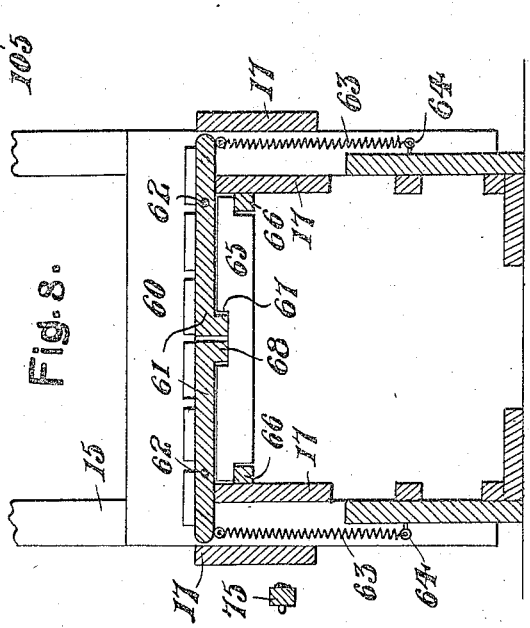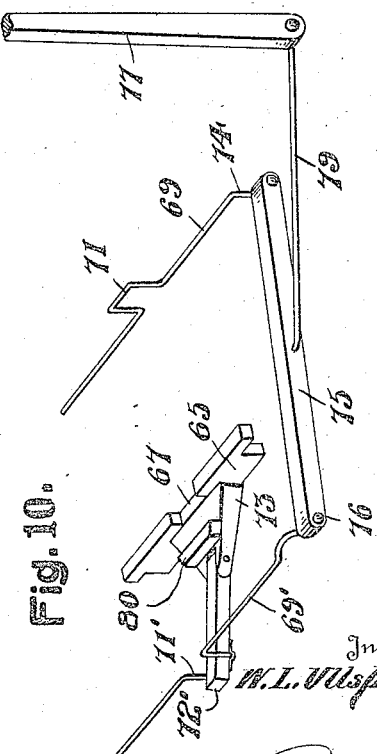

UNITED STATES PATENT OFFICE.

WENZEL L. ULLSPERGER, OF COLERIDGE, NEBRASKA.

MANURE-LOADER.

1,242,083.  Specification of Letters Patent.  Patented Oct. 2, 1917.

Application filed January 8, 1917. Serial No. 141,181.

*To all whom it may concern:*

Be it known that I, WENZEL L. ULLS-PERGER, a citizen of the United States, residing at Coleridge, in the county of Cedar and State of Nebraska, have invented certain new and useful Improvements in Manure-Loaders, of which the following is a specification.

This invention relates to certain new and useful improvements in manure loaders.

The primary object of the invention is the provision of a mechanical loading device especially adapted for employment upon farms for the loading of manure, litter and other commodities into wagons to be carted away. The device is equally serviceable in connection with loading large quantities of matter from wagons into railway cars in which even the wagons are dumped into the device and the commodity readily elevated and re-dumped into the cars.

A further object of the device is to provide a loader for barnyard use arranged with a ready means for suitably depositing a plurality of small loads of manure within a carrying member, the latter being readily serviceable in elevating and dumping the manure into suitable vehicles conveniently positioned.

A still further object is the provision of a readily portable manure loader adapted to receive the manure easily deposited into the same from the ground and arranged for elevating and dumping the same into wagons whereby the manure loading operation is more easily and quickly accomplished, the device being especially serviceable where large quantities of manure are to be loaded at different points in a barnyard or upon a farm.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—

Figure 1 is a top plan view of the device with the side approaches partially broken away, the elevating car being illustrated in its dumping position.

Fig. 2 is a rear end elevation of the device with the forward hinged portion folded and the rear detachable portion removed.

Fig. 3 is a perspective view of the removable rear end portion of the device detached.

Fig. 4 is a side elevation thereof with the forward portion of the device shown in central longitudinal section.

Fig. 5 is a perspective view of a central portion of one of the side approaches with which the device is provided.

Fig. 6 is a side elevation of one of the side approaches.

Fig. 7 is an enlarged elevational view of a rear side portion of the device showing the platform releasing mechanism.

Fig. 8 is a vertical transverse sectional view illustrating the same taken through the rear portion of the loader.

Fig. 9 is a vertical sectional view through a rear portion of the loader taken longitudinally thereof, and, Fig. 10 is a perspective view of portions of the platform releasing mechanism detached.

The present form of loader consists of a foundation or box-like frame 10 adapted to either rest upon the ground 11 to be readily pulled along by horses after the manner of a stone-boat or low wheels may be provided under the body 10 if desired.

A forward upper frame 12 and a rearwardly positioned frame 13 are mounted upon the box 10 being connected by parallel top rails 14. The rear frame 13 comprises four upright corner posts 15 supporting a rectangular top member 16 and provided with a platform support 17 above the box 10. Upwardly inclined upper and lower parallel tracks 18 and 19 respectively, are arranged between the forward frame 12 and the box 10, the said tracks entering the box forwardly of the rear frame 15 passing beneath the supports 17 in horizontal arrangement therebeneath providing a terminal forward end section of double track 20 upon which a dump car 21 is positionable for loading.

The said car 21 is in the form of an open-ended scoop arranged with a pair of forward wheels 22 positioned beneath the car for riding upon the track 19. Rear wheels 23 are journaled upon the rear closed end 24 of the car being in a plane above the forward wheels 22 whereby the said rear wheels are operatively positioned upon the upper track 18. Guide rails 25 are provided for the rear wheels 23 being positioned above and parallel with the track 18, the said guide rails rearwardly terminating in the said platform supports 17, the latter forming guards for the wheels 23 above the track end 20. Opposite abutments 26 are carried by the end portion 20 adapted for engagement by the wheels 22 of the car for stopping the same in the position for loading.

A forward dip is arranged in the lower track 19 by means of oppositely positioned metallic rail extensions 27 having forward loops 28 for receiving the wheels 22 of the car 21 when in its dumping position, it being noted that the rails 27 have upwardly curved and backwardly bent portions 29 having their terminal ends secured as at 30 to the cross bar 31 of the frame 12. At a point adjacent the frame 12, the track 18 is provided with a bearing surface 32 arranged at a greater inclination than the main portion of the said track while the guide bars 25 have a similar portion 33 parallel therewith, it being noted that the extreme forward end of the track 18 has a terminal section 34 arranged in a plane parallel with and above the track 18, the adjacent portions 35 of the metal rails 19 being parallel with the section 34 and providing guards for the car wheels 23 when arranged thereon with the car at its extreme forward movement in its dumping arrangement, as best illustrated in Fig. 4 of the drawings.

A swinging bail 36 is provided for the car 21 having an elevating rope 37 arranged over a pulley 38 carried by the said bail with one of its ends anchored as at 39 to a U-shaped forward portion 40 hinged as at 41 to the frame 12 and maintained in its operative position by means of opposite hooks 42 engaging within eyes 43 to opposite strengthening blocks 44 arranged upon the frame 12 for the rail loops 28. The rope 37 passes from the pulley 39 over a similar pulley 45 attached to the frame 40 and thence over a pulley 46 of the cross brace 31 to a sheave 47 journaled in an angularly-positioned strip 48 of the frame top 16. A V-shaped draft and slack adjuster 49 is pivoted as at 50 between two of the opposite posts 15 of the frame 13 and the rope 37 passes through a sheave 51 in the apex or closed end of the said equalizer, the free end of said rope passing laterally of the device adapted to be attached to any desirable form of hoisting means such as horses, for drawing the car 21 from its loading position upon the rear track portion 20 to its forward dumping position at the top of the tracks 18 and 19.

Pulling outwardly upon the rope 35 during the operation of the device tilts the equalizer 19 downwardly to a substantially vertical position and upon releasing the pull for allowing the car 21 to return downwardly of the tracks 18 and 19, a return cord 52 attached to an eye 53 at the closed end of the equalizer and passing from a pulley 54 at the opposite side of the frame 16 automatically accomplishes the return of the equalizer to its horizontal position by means of a helical spring 53 secured at one end to the free end of the cord 52 and anchored at its opposite end to the side member 14 of the frame at the opposite side thereof from the point of attachment of the pulley 54. A return rope 55 for the car 21 is secured to the rear end 24 thereof and passes rearwardly through the frame 13 at the lower end thereof and is provided with any desirable form of pulling means, it being understood that a rearward pull exerted upon the rope 55 when the car is in its dumping position as shown in Fig. 4 of the drawings, will forcibly pull the car down the tracks 18 and 19 to its horizontal loading position upon the track portion 20.

Upon the supports 17 within the frame 13 stationary platform strips 56 are oppositely arranged at the forward and rear sides of the frame being provided with slots 57 therein adapted for the reception of removable guide strips 58 of T-shaped formation having portions 59 adapted for arrangement within the said slots. Forward and rear braces 60 are mounted upon the platform strips 56 engaging the opposite posts 15 adjacent the longitudinal edges of the strips 58. A drop platform is arranged between the platform strips 56 consisting of two oppositely arranged sections 61 pivoted at opposite points 62 within the frame 15, return springs 63 being connected between the rear ends of the sections 61 and the frame box 10 as at 64. By this arrangement it will be seen that upon depositing a sufficient load upon the platform sections 61 to overcome the spring 63, such load will automatically depress the inner ends of the platform sections depositing the load there-beneath and within the car 21 if positioned upon the track portion 20 to receive the same. Locking slides 65 are shiftably arranged upon cleats 66 secured to the inner faces of the platform supports 17, the said slides being adapted for simultaneous opposite movement to points beneath the platform sections 61 from points downwardly and rearwardly thereof beneath the platform strips 56. The slides 65 are provided with central notches 67 in their upper edges adapted to lockingly receive depending flanges 68 upon the inner adjacent edges of the platform sections 61 when the said sections are in their normal horizontal closed positions. An operating shaft 69 is journaled upon the rear end of the frame 13 to the said frame and also to a transverse brace 70 connecting the guard rail portions 17 together, an intermediate crank portion 71 being arranged in the said shaft pivotally connected by means of a link 72 with a rear triangular extension 73 of the adjacent slide 65 while a terminal crank 74 is provided for the shaft laterally of the frame to which the rear end of a shifting link 75 is pivotally mounted.

A forward shaft 69' is pivoted to the frame 12 and the forward platform strip 56 in a plane above that of the rear shaft 69 and is arranged with an intermediate crank portion 71' pivotally attached by means of a link 72' with the triangular extension 73 of the oppositely positioned locking slide 65. The forward shaft 69' has a terminal crank end 76 positioned in a different plane from the crank portion 74 and having the forward end of the shifting link 75 pivoted thereon. An operating hand lever 77 is pivoted in a block 78 rearwardly projecting from the frame 13, a link 79 pivotally connecting the lower end of the said lever with the shifting link 75 substantially centrally of the latter.

A transverse stop 80 is carried on the upper face of each of the wedge-shaped portions 73 of a slide 65 and being positioned outwardly of the notches 67 of the said guides, and said stops 80 are adapted to abut against the opposite ends of the flanges 68 of the platform sections 61 when the slides are arranged in their locked inward positions therebeneath and at which times the shifting link 75 is at the extreme rear limit of its movement with the crank 74 engaging the rear side of a stop loop 81 carried by the adjacent post 15 of the frame 13. When the locking slides are operatively arranged the upper hand engaging end of the lever 77 is forwardly positioned and a rear movement thereof then forwardly shifts the link 75 for divergently moving the slides 65 to their releasing positions out of alinement with the platform sections 61, the shaft crank ends 76 being at such times in engagement with the forward side of a stop loop 81 carried by the adjacent post 15. By this arrangement it will be seen that the locking slides 65 may be freely shifted upon the members 66 by means of the lever 77 inwardly and outwardly for locking the platform sections 61 against pivotal movement and again releasing the same at will.

Opposite similar side approaches 82 are provided for the platform formed within the frame 13 by means of the strips 56 and sections 61, the said approaches each having an inner section 83 hinged to the opposite side rails 84 of the frame 13, similar outward sections 85 being hinged to the sections 83, the outer edges of the outer sections being adapted to rest upon the ground when the device is operatively arranged whereby manure or other goods may be deposited upon the platform section 61 by means of vehicles or wheeled trucks adapted to travel upwardly over the approaches 82 and on to the platform between the posts 15.

A serviceable means is provided at the rear of the frame 15 for pulling the rope 70 55 and folding means for the approaches 82 when desired, the same consisting of winding drums 86 and 87 respectively, provided therefor in a frame 88 of the form best illustrated in Fig. 3 of the drawings. The said frame has opposite upright struts 89, the lower ends of which abut the rear ends of the sides of the box 10 when the frame 88 is operatively positioned and at which times blocks 90 upon the upper bars 91 of the said frame engage the rear posts 15 while spaced projections 92 receive the projecting ends 93 of the guard rail portions 11. The operative position of the frame 18 is best illustrated in Fig. 4 of the drawings, it being noted that upper and lower hook attaching means 93 are arranged between the frame 88 and the body of the loader. The rope 55 is passed through a pulley 94 of the frame 88 being secured to the drum 87, the said drum having an operating crank 95.

Pivoted hooks 96 are carried by each approach section 83 substantially centrally of each approach, the same being adapted for removable attachment with the free ends of operating cords 97. The said cords pass through pulleys 98 attached to the upper brace 48 and then pass over the aforementioned drum 86, the latter being readily turned by a hand crank 99. Upon winding up the cords 97 upon the drum 86, the sections 83 and 85 of the opposite approaches 82 will be folded and arranged elevated as illustrated in Fig. 2 of the drawings, the same remaining in such position during the transportation of the loader and being readily lowered upon releasing the drum 86.

From this detailed description of the device as well as the operation of each portion thereof, the complete operation will be understood. When it is desired for instance, to load a large quantity of manure from wagons into a railway car, the cords 37 being released from the hooks 96 and drawn upwardly out of the way, the horses are driven up one of the approaches 82 upon the horizontal platform of the frame 13, the horses and wheels preferably traveling upon the members 58. The load is then dumped upon the platform sections 61, which being locked closed by the slides 65 support the load until the vehicle travels down the opposite incline 82. It is obvious that a desirable load may be placed upon the platform section 61 by wheel-barrows or other trucks moving upwardly over either of the approaches 82. The car 21 being arranged beneath the platform section 61, the lever 77 is swung rearwardly releasing the slides 65 and allowing the sections 61 to open downwardly, depositing the load within the car 21 and whereupon the springs 63 return the platform sections to their normal horizontal positions. A draft animal is then attached to the rope 37 which draws the car 21 up the incline dumping the same into whatever receptacle is arranged for receiving the load while thereafter the crank 95 is turned for returning the car 21 to its lowered position.

Suitable supports such as hinged legs 100 are arranged beneath the approaches 82 having braces 101 and positioning hooks 102. The hooks 96 are arranged within sockets 103 whereby the said hooks may be folded out of the way. A rearwardly positioned pulley 104 may be carried by the member 48 if found desirable over which the rope 37 may be positioned instead of using the equalizer. It will be noted that the bottom of the box 10 forms in effect opposite skids for drawing the entire machine rearwardly for transporting the same from place to place, a projecting portion of the skid means being shown at 105.

The present embodiment of the device is believed to be preferable although it will be understood that minor changes may be made therein without departing from the spirit and scope of the invention.

What I claim as new is:—

1. A loading device comprising a frame having a dumping platform at one end thereof, upper and lower tracks leading from beneath said platform upwardly to a dumping position, looped rails forming a continuation of one of the said tracks and a guard for the other and having wheel-receiving depressions therein adjacent the upper end of the lower track, a dump car having forward and rear wheels upon different levels adapted for running upon the said lower and upper tracks respectively, said forward wheels being arranged within the said depressions during the dumping operation of the car with the rear wheels of the car positioned at such times adjacent the said guard portions of the rails, and operating means for the car.

2. A loader comprising a frame having upper and lower substantially parallel forwardly inclined tracks, a dump car having rearward and forward wheels arranged in different planes respectively positioned upon the said upper and lower tracks, an elevating projection arranged adjacent the forward end of the said upper track, angularly-arranged rails forming a continuation of the lower track at its upper end and having depressions within which the forward wheels of the said car are positioned during the dumping operation with the upper wheels arranged upon the said projection, the said rails having rearwardly bent portions guidingly positioned adjacent the rear wheels of the car during the dumping operation and in parallelism with the adjacent portion of the said projections, a U-shaped normally inclined yoke hinged to the forward end of the loader frame in substantial longitudinal alinement with the said upper track when the yoke is unfolded, a bail carried by said car, an adjuster pivotally arranged adjacent said platform normally horizontal thereabove, a hoisting rope for the car operatively attached to the said yoke and bail and adjuster, and a return rope for the said car attached to the latter.

3. A loader comprising a frame having a platform, a V-shaped adjuster pivoted to the said frame normally positioned horizontally above the platform, a sheave at the apex of said adjuster, an elevating car, a hoisting rope operatively connected to the said car and arranged over the said sheave, and resilient normal positioning means attached to the said adjuster adjacent the said sheave whereby the latter is automatically returned to its horizontal position after each operation of the device.

4. A loader comprising a frame having a receiving platform at one end thereof, and an inclined track terminating adjacent the opposite end of the frame, two-part approaches hinged to the opposite edges of the platform, foldable supporting struts beneath the said approaches, a winding drum removably attached rearwardly of the said frame, and hoisting cords secured substantially centrally of the said approaches and passing over the said drum, the said approaches being in their elevated folded positions when the cords are wound upon the said drum.

In testimony whereof I affix my signature.

WENZEL L. ULLSPERGER.

Copies of this patent may be obtained for five cents each, by addressing the "Commissioner of Patents, Washington, D. C."